July 18, 1933.  H. REDDING  1,918,783
VEHICLE JACK
Filed March 17, 1932   2 Sheets-Sheet 1

INVENTOR
Howard Redding
BY Fred P. Form
ATTORNEY

July 18, 1933.   H. REDDING   1,918,783
VEHICLE JACK
Filed March 17, 1932   2 Sheets-Sheet 2
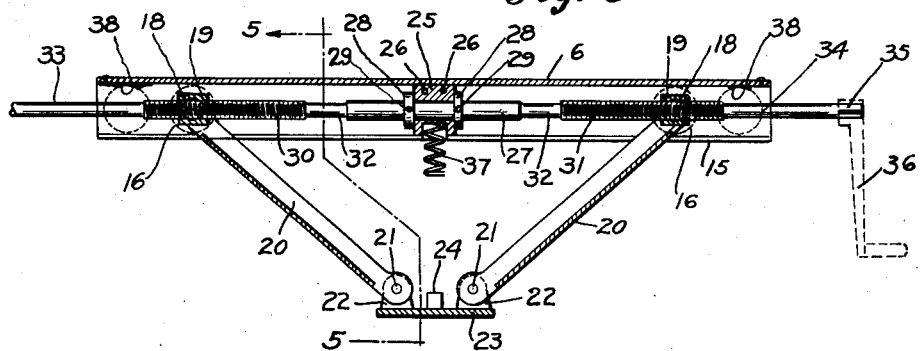
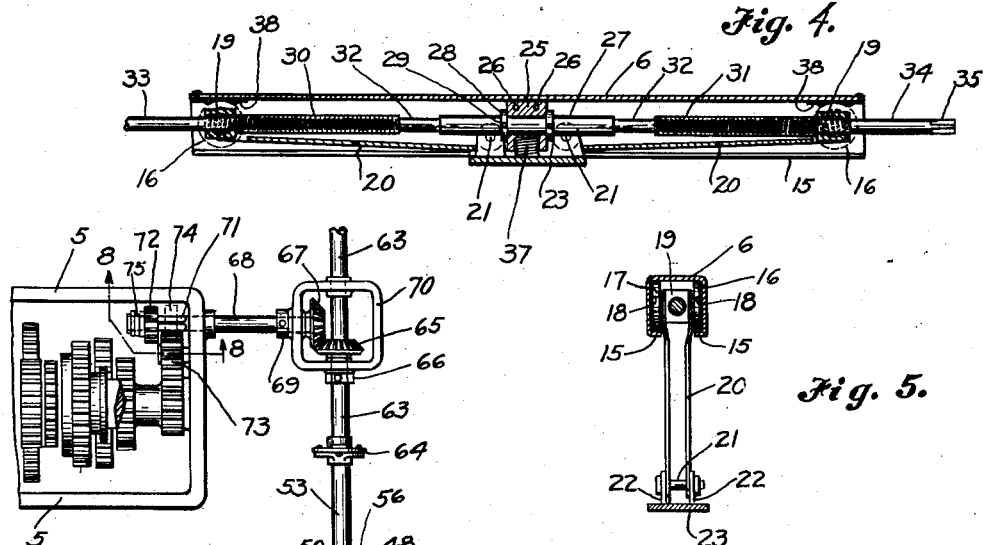
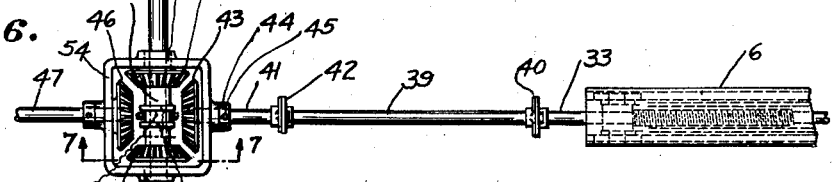
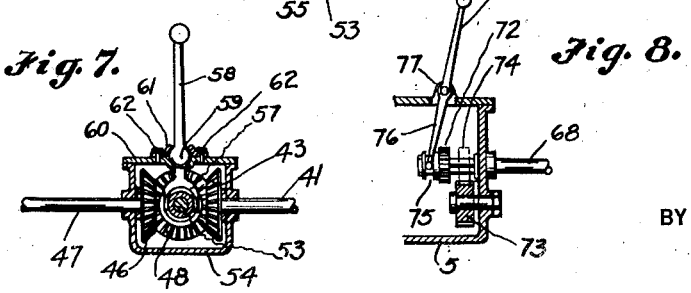
INVENTOR
Howard Redding
BY
ATTORNEY Patented July 18, 1933

1,918,783

UNITED STATES PATENT OFFICE

HOWARD REDDING, OF SEATTLE, WASHINGTON

VEHICLE JACK

Application filed March 17, 1932. Serial No. 599,540.

This invention relates to improvements in jacks and more particularly to such devices as are adapted to the raising of the chassis of an automobile and the like, so as to bring a traction wheel out of contact with the ground surface.

An important feature of this invention is that my improved jack may be operated effectively and quickly by the driver while seated in the usual driver's seat.

Other features and objects will appear as the invention is more fully hereinafter described in the following specification, shown in the accompanying drawings, and finally pointed out in the appended claims.

In the drawings:

Fig. 3 is an enlarged sectional view of one lifting jack partly extended.

Fig. 4 is a similar view showing a jack in a collapsed position.

Fig. 5 is a section upon the line 5—5 of Fig. 3.

Fig. 6 is an enlarged view showing connection for one jack, the other three being connected in a like manner.

Fig. 7 is a section upon the line 7—7 of Fig. 6.

Fig. 8 is a section upon the line 8—8 of Fig. 6.

Figure 1:
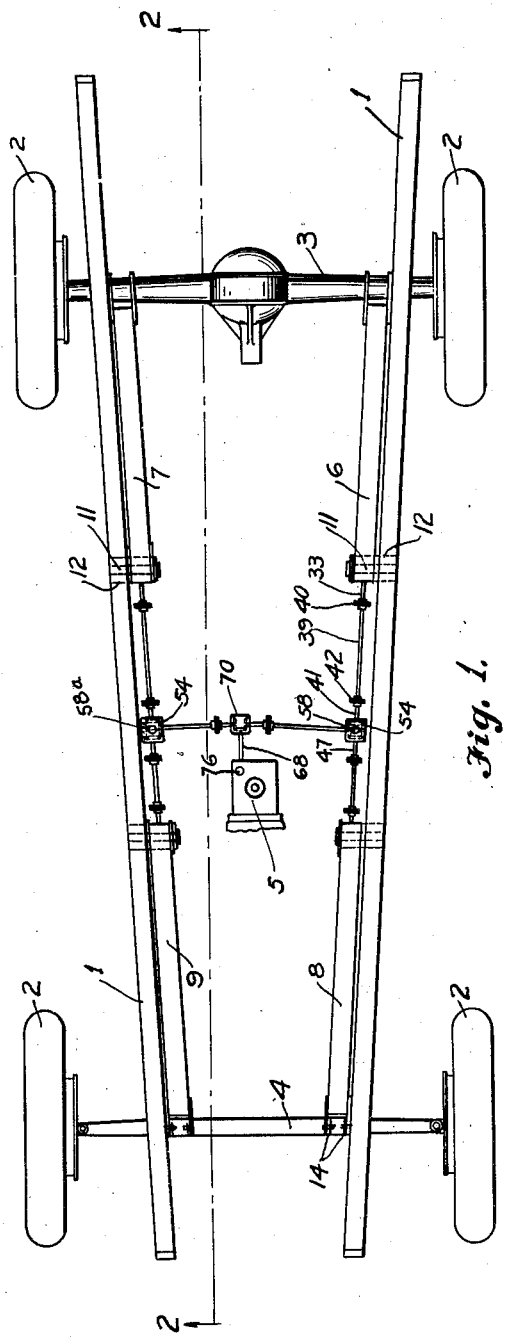
Fig. 1 is a plan view of a chassis with my lifting jacks attached.
Figure 2:
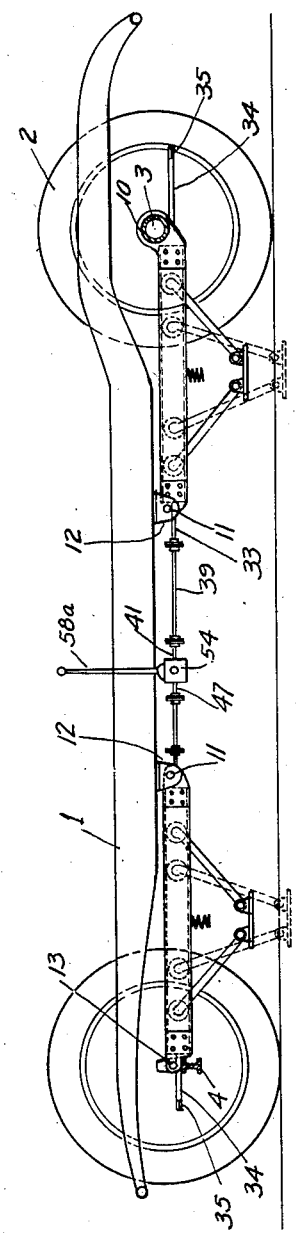
Fig. 2 is a section upon the line 2—2 of Fig. 1.

Referring more particularly to the drawings, reference numeral 1 represents the usual frame of the car and 2 the wheels, 3 the back axle, 4 the front axle and 5 the transmission case, and 6, 7, 8, and 9 the housings of the four jacks connected to the chassis. The back jacks are pivoted around the back axle by any approved means as shown at 10, and by pins 11 to the brackets 12 which pivoted to the underside of the frame. are secured The front end of the front jacks are pivoted to the front axle by means of pins 13 in brackets 14 which are secured to the front axle. The general construction of all the jacks are the same, so that a description of the jack with the housing whose reference numeral is 6 will be understood to apply to any one of the four jacks. The general section of the frame 6 is that of an inverted U with the ends of the legs bent inwardly as shown at 15, (Figs. 3, 4, and 5), forming tracks or runners upon which ride wheels 16 and 17 which are mounted upon pivots or trunnions 18 of block 19. Also pivoted upon pivots 18 between the wheels and the center portion of block 19 are the upper or outer ends of U shaped bars 20, Figs. 3, 4, and 5. The inner or lower ends are pivoted by means of pins 21 to brackets 22 projecting upwardly from base or shoe 23, (Figs. 3, 4, and 5). In the center of the upper face of shoe 23 is a pilot pin 24 (Fig. 3). In the center of casing 6 are secured blocks 25 by means of bolts 26. Passing longitudinally through this block is a shaft 27, restrained from moving axially by means of collars 28, secured to the shaft by means of pin 29, but free to rotate in the block. The shaft 27 has right and left hand threaded portions 30 and 31 respectively. 32 are recessed portions whose diameter is equal to that of the root of the thread. The outer ends of the shaft are turned down as shown at 33 and 34, the diameters also being equal to that of the root of the thread. The outer end 34 is provided with a square shank 35 on to which may be slipped a crank shown in dotted lines at 36, (Fig. 3). (A crank with an extension may also be used). The blocks 19, (Figs. 3, 4, and 5) are threaded so as to receive screws 30 and 31; it is now evident that by rotating the screws that the blocks 19 will be moved inwardly or outwardly depending on rotation, the movement inward of the block, it is evident, will tend to lower the shoes 23 through the action of links or bars 20, the outward movement of blocks 19 will cause an upward movement of shoe 23. When the blocks 19 have reached their extreme limits of outward travels as shown in Fig. 4 they ride out on the turned down portions 33 and 34 to prevent injury of the mechanism if rotation was not stopped at the proper time. When the blocks 19 have reached the desired inward travel they ride on to recess portion 32 to prevent injury to mechanism as above described.

To the underside of center block 25, (Figs. 3 and 4) is a recess into which is secured the upper end of a spring 37, the object of which is to prevent rattling when the jack is in a collapsed position as shown at Fig. 4 and also to give the shoe 23 a start downward when it is desired to put the jack into operation. In the outer ends of housing 6 (Figs. 3 and 4) are flat springs 38 on to which the wheels 17 and 16 will ride to prevent rattling when the car is in motion.

Referring to Fig. 6, shaft 33 of the lifting jack is connected to shaft 39 by means of any approved type of universal joint 40. Shaft 39 in turn connects to shaft 41 by means of universal joint 42. To the inner end of shaft 41 is connected a bevel gear 43. Bevel gear 43 and shaft 41 are held in place longitudinally by means of collar 44 secured to shaft 41 by pin 45. 46 is a similar bevel gear connected to a shaft 47 which in turn connects to a jack in front of the chassis by means of universal joints in a similar manner as previously described, for the back jack. 48 and 49 are two beveled gears having a common hub 50 provided with collars 51 spaced so as to form a groove 52. Gears 48 and 49 are slidably secured to a common shaft 53. Gears 43, 46, 48 and 49 are enclosed in a case 54. The openings 55 and 56 of the case 54 through which the shaft 53 protrudes are elongated so as to permit the shaft 53 to move sidewise. Into groove 52 of the hub 50 (Fig. 6) is connected the forked end 57 of a handle 58 (Fig. 7). 59 is an enlarged spherical portion of the handle 58. 60 is a cover for the case 54. The center of the cover 60 is ground out so as to receive the ball 59 of the handle 58. 61 is a small cap ground to fit the ball 59 and secured to case 60 by means of screws 62. The ball 59 in connection with the cover 60 and the cap 61 forms a ball and socket joint. The opening in cover 61 is restricted to such an extent so as to prevent bevel gears 48 or 49 from engaging with bevel gears 43 or 46 simultaneously and also so as to prevent bevel gears 48 and 49 from simultaneously engaging with either 43 or 46, but the combination of a longitudinal and lateral movement of handle 58, or in other wards a diagonal movement of handle 58, with respect to the axis of shafts 41 and 53, (Fig. 6) will permit gear 48 to engage with either bevel gear 43 or 46 independently or will permit bevel gear 49 to engage with bevel gear 43 or 46 independently.

From the above it will be seen that either the rear jack or the front jack may be raised or lowered one at a time but not simultaneously.

Referring again to Fig. 6, shaft 53 is connected to shaft 63 by means of universal joint 64. To shaft 63 is connected a bevel gear 65. End play of shaft 63 and bevel gear 65 is prevented by collar 66 secured to shaft 63. Meshing with bevel gear 65 is another bevel gear 67 which is secured to shaft 68. End play of this shaft is prevented by collar 69. Bevel gears 65 and 67 are enclosed in a gear housing 70. The end of the shaft 68 opposite the bevel gear 67 protrudes through the gear case 5 and is provided with a square shank 71 to which is slidably mounted a small spur gear 72 so arranged as to mesh with the intermediate gear or idler 73 which is now present in all standard automotive gear cases it being used to get the reverse of the car. Gear 72 may be slid out or in mesh with gear 73 as shown in the dotted lines 74, (Figs. 6 and 8). Gear 72 is provided with a groove 75 into which fits the forked end of a lever 76, (Fig. 8). Lever 76 is pivoted in the cover of the gear case as shown at 77. Handles 58 and 76 project through the floor of the car where they may be conveniently reached by the occupants in the front seat.

The method of operation is as follows: When lever 76, (Fig. 8) is thrown forward the gear 73 being in motion gears 67 and 65 will be set into motion which through shafts 63 and 53 sets bevel gears 48 and 49 into motion then by throwing handle 58 in the desired direction lifting jack 6 or 8, (Fig. 1) may be raised or lowered. In a like manner by operating lever 58—a, (Fig. 1), jack 7 or 9 may be raised or lowered. By operating levers 58 and 58—a at the same time it will be seen that jacks 6 and 7 can be operated simultaneously, or 8 and 9 can be operated simultaneously, or 6 and 9, or 7 and 8, but the two jacks on the same side can not be operated together. If the power fails the jacks may still be operated by connecting a crank to the square shank 35 on the extended ends 34 of the screws, (Figs. 1, 3, and 4).

What I desire to claim and secure by Letters Patent is:

1. In a vehicle, lifting jacks, rotatable means for operating said lifting jacks and selective means interposed between said rotatable means and a pair of said jacks for controlling the operation thereof, comprising a pair of slidably mounted bevel gears, rotatable with said rotatable means, bevel gears associated with each of said lifting jacks and means for moving each one of said pair of gears selectively into engagement with said latterly named gears for controlling the operation of said jacks.

2. In a vehicle, a pair of jacks, a rotatable shaft for operating said jacks, a pair of bevel gears rotatable with but slidably mounted on said shaft, bevel gears associated with each of said lifting jacks, a housing for said gears having an elongated bearing for said shaft to allow lateral movement thereof, a covering on said housing having a socket, a lever for engagement with said pair of gears, having a ball for engagement with said socket, whereby upon movement of said lever, each one of said pair of gears are selectively operated into engagement with said latter named gears.

HOWARD REDDING.